United States Patent
Ranganathan et al.

(10) Patent No.: US 11,966,828 B2
(45) Date of Patent: Apr. 23, 2024

(54) ESTIMATING PERMEABILITY VALUES FROM WELL LOGS USING A DEPTH BLENDED MODEL

(71) Applicants: CGG SERVICES SAS, Massy (FR); KUWAIT GULF OIL COMPANY, Ahmadi (SA)

(72) Inventors: Chiranjith Ranganathan, Houston, TX (US); Francisco Brito, Houston, TX (US); Ahmad S D S M Albussairi, Sugar Land, TX (US)

(73) Assignees: CGG SERVICES SAS, Massy (FR); KUWAIT GULF OIL COMPANY, Ahmadi (KW)

( * ) Notice: Subject to any disclaimer, the term of this patent is extended or adjusted under 35 U.S.C. 154(b) by 853 days.

(21) Appl. No.: 16/787,245

(22) Filed: Feb. 11, 2020

(65) Prior Publication Data
US 2020/0401951 A1    Dec. 24, 2020

Related U.S. Application Data

(60) Provisional application No. 62/864,541, filed on Jun. 21, 2019.

(51) Int. Cl.
*G06N 20/20* (2019.01)
*G01V 1/30* (2006.01)
*G01V 1/50* (2006.01)

(52) U.S. Cl.
CPC ............ *G06N 20/20* (2019.01); *G01V 1/306* (2013.01); *G01V 1/50* (2013.01); *G01V 2210/6169* (2013.01); *G01V 2210/6246* (2013.01)

(58) Field of Classification Search
CPC .......... G06N 20/20; G01V 1/306; G01V 1/50; G01V 2210/6169; G01V 2210/6246
See application file for complete search history.

(56) References Cited

U.S. PATENT DOCUMENTS 5,251,286 A    10/1993 Wiener et al.
6,714,871 B1    3/2004 Xu et al.
(Continued)

FOREIGN PATENT DOCUMENTS

WO    WO-2018125760 A1 *    7/2018    ............. E21B 41/00

OTHER PUBLICATIONS

Petro Wiki, "Types of logs", captured Dec. 2, 2013 (Year: 2013).*
(Continued)

*Primary Examiner* — Regis J Betsch
(74) *Attorney, Agent, or Firm* — PATENT PORTFOLIO BUILDERS PLLC

(57) ABSTRACT

Permeability values are estimated based on well logs using regression algorithms, such as gradient boosting and random forest. The training data is selected from well logs for which core-analysis-based permeability values are available. The estimated permeability values are used to plan hydrocarbon production. The well logs used to build the depth blended model may include total porosity, gamma ray, volume of calcite, density, resistivity, and neutron logs. Selecting the training data may include grouping the well logs according to regions expected to have similar characteristics, choosing a subset of the well logs corresponding to wells expected to provide stable models according to pre-determined criteria, and/or identifying training zones on the chosen well logs according to one or more rules. Validation and consistency checks may also be performed.

20 Claims, 8 Drawing Sheets

(56) References Cited

U.S. PATENT DOCUMENTS

| | | |
|---|---|---|
| 8,510,242 B2 | 8/2013 | Al-Fattah |
| 9,229,127 B2 | 1/2016 | Leseur |
| 9,501,716 B2 | 11/2016 | Fleishman et al. |
| 2013/0282286 A1 | 10/2013 | Thorne |
| 2017/0017896 A1* | 1/2017 | Hamann ................ G06N 20/20 |
| 2017/0364795 A1 | 12/2017 | Anderson et al. |
| 2019/0257977 A1* | 8/2019 | Skalinski ................ G06F 30/20 |
| 2019/0331813 A1* | 10/2019 | Zhang ..................... G06F 17/16 |

OTHER PUBLICATIONS

Ahmed Elsherif et al., "Facies Analysis and Permeability Estimation in Late Cretaceous Giant Carbonate Reservoir using LWD Technology: A Case Study in Sabriyah Field, North Kuwait," AAPG Search and Discovery Article #41842, 2016, 22 pages.

* cited by examiner

800 though various embodiments of the subject matter disclosed herein gen
erally relate to methods and devices using a machine learn-

ESTIMATING PERMEABILITY VALUES FROM WELL LOGS USING A DEPTH BLENDED MODEL

BACKGROUND

Technical Field

Embodiments of the subject matter disclosed herein generally relate to methods and devices using a machine learning paradigm for regression algorithms to generate a model for estimating permeability values based on well logs (i.e., series of measurements of different properties acquired at discrete depths along wells using a logging tool).

Discussion of the Background

Oil and gas industry often uses exploratory wells to gather information in order to plan production. A logging tool (i.e., a string of instruments recording petrophysical properties using a variety of sensors) lowered into such wells acquires series of measurements of different properties (e.g., the natural gamma ray, electrical, acoustic, stimulated radioactive responses, electromagnetic, nuclear magnetic resonance, pressure, etc.) at discrete depths along the well. These measurements are collectively known as well logs.

Additionally, at least in some exploratory wells, rock samples (known as "cores") are removed from known depths and further analyzed (e.g., using an electronic microscope) to extract other rock property values such as porosity, grain size, grain orientation, etc. Rock samples are collected far less often than log measurements are acquired. For example, 15-20 core samples are acquired for 20,000 feet of drilled wells, in contrast with the well log measurement interval being every few feet.

Permeability, which is not measurable or reliably inferred from well logs, is a rock property used in designing oil and gas exploitation plans (e.g., for choosing drainage or fracking stage locations, estimating production rates, optimizing hydrocarbon recovery paths, etc.). Permeability quantifies the inter-connectedness between rock pores; that is, how easily a fluid can pass through the rock. Therefore, permeability depends on the fluid type, pore size and distribution, flow direction, facies type, shale content and heterogeneities such as non-connecting vugs and fractures.

Most known oil and gas reserves are carbonate reservoirs inside carbonate rocks such as limestone, dolomite, etc. Carbonate rocks are difficult to characterize because their porosity and permeability are highly variable. The porosity of carbonate rocks can be intergranular porosity (determined by the space between carbonate grains), vuggy porosity (due to unconnected pores resulting from dissolution of calcite by water) and fracture porosity (caused by stress following deposition). Characterizing carbonate reservoirs is challenging because the intergranular porosity, vuggy porosity, and fracture porosity are mixed in carbonate rocks, and the mixing may be inhomogeneous. Vuggy porosity is significant where the rock's morphology changed due to geological processes such as dissolution, sedimentation and physical/chemical processes. Such morphology changes cause weathering, which is more significant in carbonate formations than in other formations.

Conventional methods upscaling rock sample measurements of porosity to predict permeability from well logs for a carbonate reservoir turned out to be inaccurate due to the different types of porosity (especially vuggy porosity). Additionally, well logs of wells in carbonate rock tend to be noisy (i.e., with outlying values), which further complicates permeability predictions that are sensitive to the quality of the input data.

Therefore, there is a need to further develop improved techniques for estimating permeability based on well logs in carbonate formations.

SUMMARY

The various embodiments generate a depth blended model for estimating permeability based on well logs. The depth blended model selectively outputs values obtained via at least two regression algorithms trained on selected data from well logs for which core-analysis-based permeability values are available.

According to an embodiment, there is a method for estimating permeability based on well logs. The method includes selecting training data from well logs for which core-analysis-based permeability values are available, training regression algorithms using the training data to generate a depth blended model for estimating permeability values, and applying the depth blended model to the well logs other than the training data to estimate model-based permeability values. The model-based permeability values are used to plan hydrocarbon production.

According to another embodiment, there is a permeability estimating apparatus with a processor configured to select training data from well logs for which core-analysis-based permeability values are available, to train regression algorithms to generate a depth blended model for estimating permeability values based on well logs included the training data with their corresponding core-analysis-based permeability values, and to apply the depth blended model to the well logs other than the training data for obtaining model-estimated permeability values. The apparatus also has a communication interface connected to the processor and configured to exchange data with other devices and/or enable interaction with a user. The model-based permeability values are used to plan hydrocarbon production.

BRIEF DESCRIPTION OF THE DRAWINGS

For a more complete understanding of the present inventive concept, reference is now made to the following descriptions taken in conjunction with the accompanying drawings, in which.

DETAILED DESCRIPTION OF THE INVENTION

Figure 1:
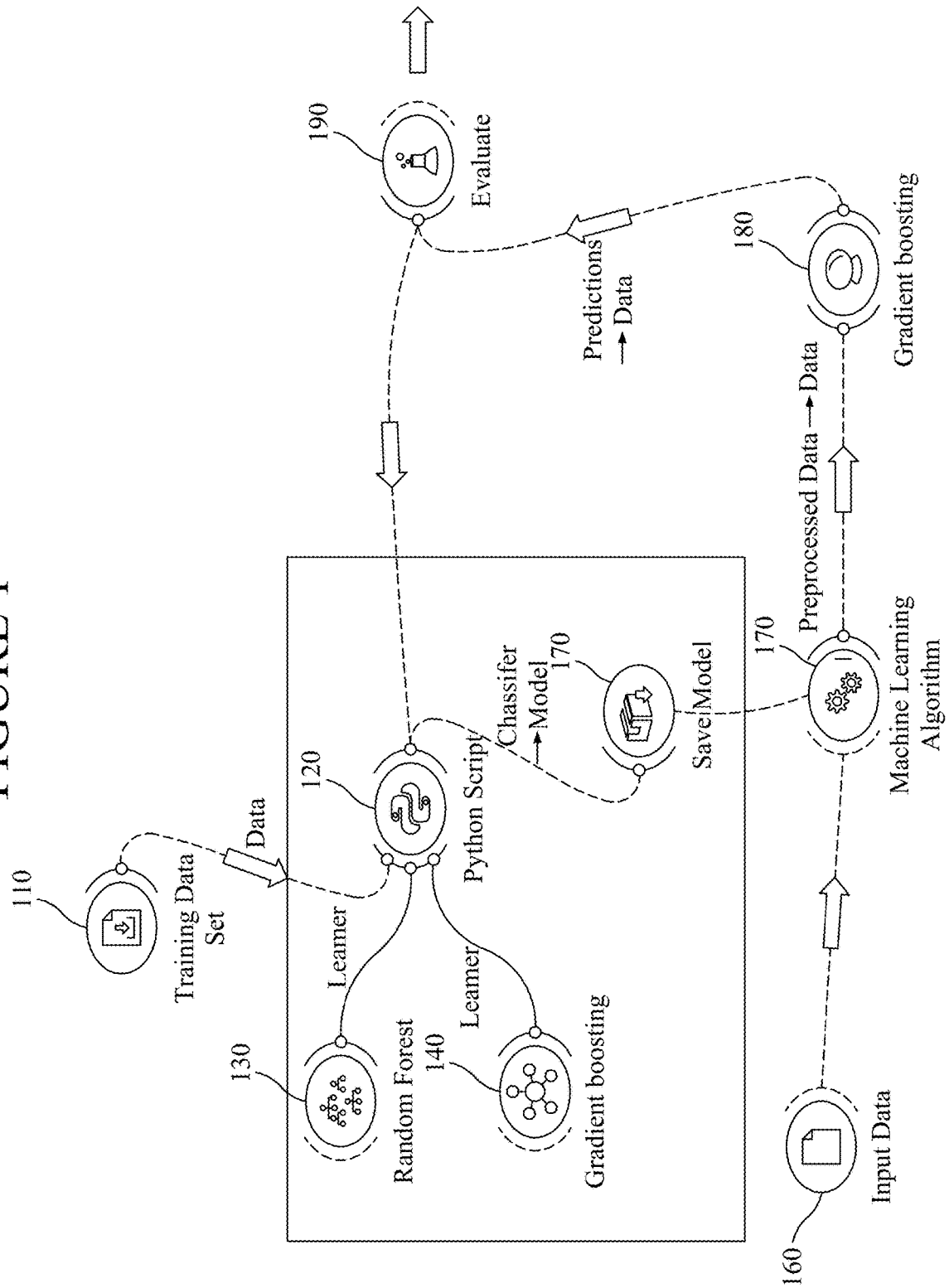
FIG. 1 is a diagram illustrating the approach to estimating permeability values

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed using the terminology of artificial intelligence techniques and petrophysical exploration.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

The embodiments described in this section employ supervised machine learning techniques to produce regionalized depth permeability logs (i.e., values associated with a series of discrete depths) used for planning hydrocarbon production. Note that in the provisional application, the term "predict" was used, whereas the term "estimate" is used in this document; they are intended to mean the same thing, i.e., assessing permeability values.

Machine learning algorithms are an alternative to using pre-determined porosity-permeability equations. A machine learning algorithm learns the local/regional relationship between permeability and porosity. Machine learning algorithms make use of algorithms for classification or estimation. The algorithm is trained using porosity values obtained from log data and permeability values obtained from core analysis. In other words, the core-analysis-based permeability values are used to calibrate one or more of the relationships between the permeability and the intergranular, vuggy and fracture porosity. The trained algorithm is used to estimate permeability values for other locations (e.g., wells where no cores are extracted).

Training may use one or more of total porosity, gamma ray, volume of calcite, resistivity, density and neutron log that are included in the well logs. However, the logs may include more than these logs. A local inquiry may determine the local optimal combination of curves (i.e., logs) to be taken into consideration.

Machine learning is used to train computer-implemented algorithms capable of learning to estimate permeability values. Suitable machine learning algorithms include, for example, deep neural network, multilinear regression, random forest, gradient boosting and combinations thereof. The resulting model is blended in the sense that it does output the permeability value estimated by the same algorithm for all depths and fields, but results of at least two algorithms are combined.

Some embodiments use a primary algorithm and a secondary algorithm for estimating permeability values at discrete depths. Whether the permeability value output by the first algorithm or the one obtained by the second algorithm is output depends on one or more criteria. For example, a criterion may be a requirement of non-negative values suitable for calculation of logarithms.

In one embodiment, the primary algorithm is gradient boosting and the secondary algorithm is random forest. A gradient boosting algorithm is a machine learning technique for regression and classification problems that produces an estimation model in the form of an ensemble of weak prediction models (e.g., decision trees). This algorithm generates the depth blended model in a stage-wise fashion while optimizing a loss function. This functional gradient view of boosting has led to the development of boosting algorithms in many areas of machine learning and statistics beyond regression and classification. A random forest algorithm (also known as "random decision forests") is an ensemble learning method for classification, regression and other tasks that operates by constructing a multitude of decision trees at training time and outputting the class that is the mode of the classes (classification) or mean prediction (regression) of the individual trees. Random decision forests correct for decision trees' habit of overfitting to their training set. A random forest algorithm can be used for both classification and regression tasks and adequately handles missing-value-related situations.

The gradient boosting is an unbounded regression, which can produce negative numbers. The random-forest-estimated permeability value is adopted where (i.e., the depth at which) the gradient-boosting-estimated permeability value is negative. The machine learning approach builds depth blended models based on the local well logs. FIG. 1 is a diagram illustrating the approach to estimating permeability values implemented in several embodiments.

Training data set 110 includes well logs and core analysis results for a subset of wells. A Python script 120 may be used to perform training of the random forest algorithm 130 and gradient boosting algorithm 140, yielding a depth blended model that may be stored in a memory 150. Other well logs are then input (as input data 160) to a machine learning algorithm engine 170 using the depth blended model to estimate permeability values 180 for other wells. The estimated porosity values 180 may be used to plan hydrocarbon production at 190. These results may also be used for validating the depth blended model (where core analysis results are available) and potentially further training as suggested by the path and the arrow from 190 to 120 in FIG. 1.

Figure 2:
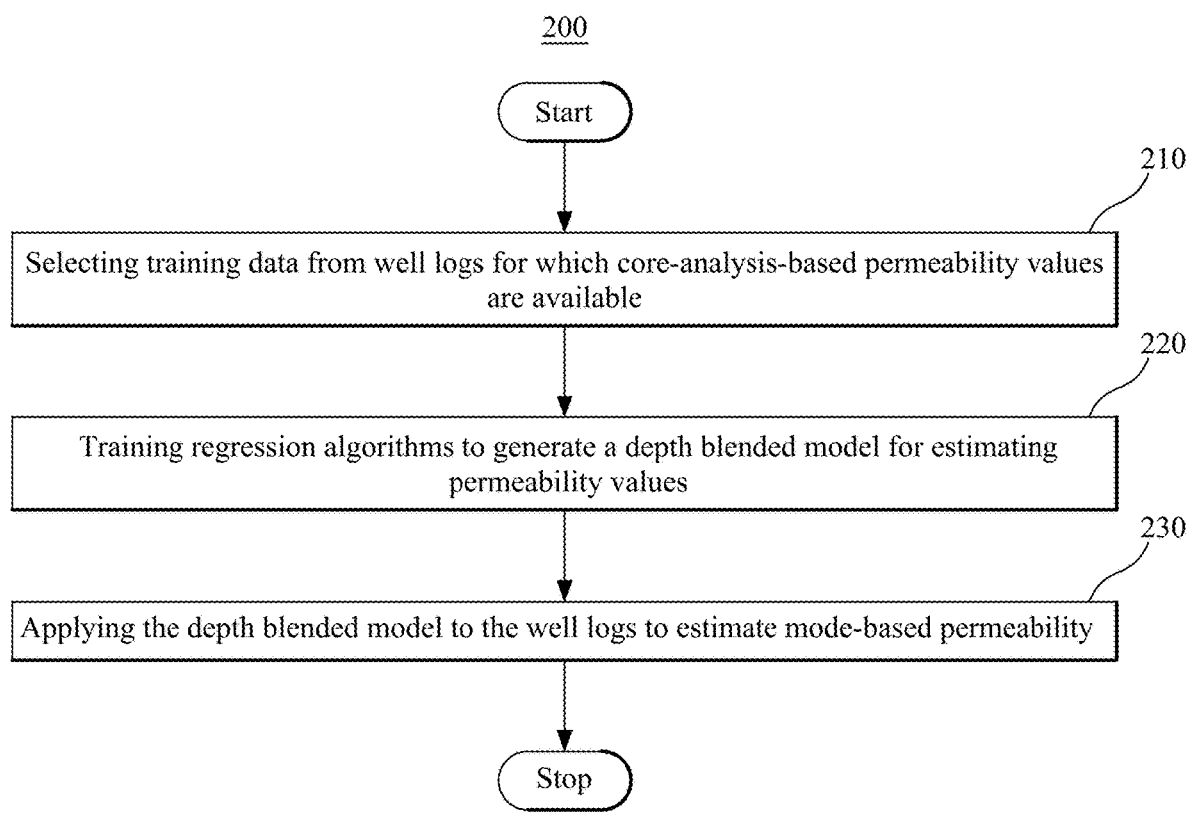
FIG. 2 is a flowchart of a method for estimating permeability values from well logs according to an embodiment.

FIG. 2 is a flowchart of a method for estimating permeability values from well logs according to an embodiment. Method 200 includes selecting training data from well logs for which core-analysis-based permeability values are available at 210. Permeability values obtained from core analysis (i.e., core-analysis-based permeability values) are available for the selected training data.

For example, exploratory wells may be drilled at a few miles' distance from one another and may have depths of 1,500-8,000 ft. The wells are not usually drilled in regular patterns, but rather at locations selected on pragmatic considerations, such as to acquire the desired amount of detail while minimizing the cost (number of wells) and environmental disruption. Available geological information is used when planning exploratory well locations.

Step 210 may also include interpolation of the well logs to match the locations from which the cores were extracted. PowerLog's documentation (PowerLog is a software package for well log analysis, from data loading and initial evaluation to interactive editing, data conditioning and petrophysical interpretation) provides details about one way of obtaining well logs from standard equipment with given curve names, zone, sampling grid, etc. Value units of well logs are consistent, to prevent inconsistent outcomes.

Method 200 may then include pre-processing that interpolates and/or scales log values to correspond to the core locations. Performing pre-processing allows the algorithms to converge faster.

Two regressive algorithms are then trained to generate a depth blended model for estimating permeability values at 220. More than two algorithms may be used. A primary algorithm's results may be preferred unless they are undesirable based on some criteria (e.g., the values are not valid in logarithmic scale). If the primary algorithm's results are undesirable, the secondary algorithm's results are used for that depth.

The primary and the secondary algorithms may be gradient boosting and random forest, respectively. Using a combination of algorithms leads to better results than when the algorithms are used separately. Several alternate algorithms (e.g., Adaboost, BayesianRidge, etc.) may also be used. The combination of two algorithms has yielded the best estimated permeability values.

Method 200 then includes applying the depth blended model to the well logs of other portions of the wells or target wells to estimate permeability values at 230.

Figure 3:
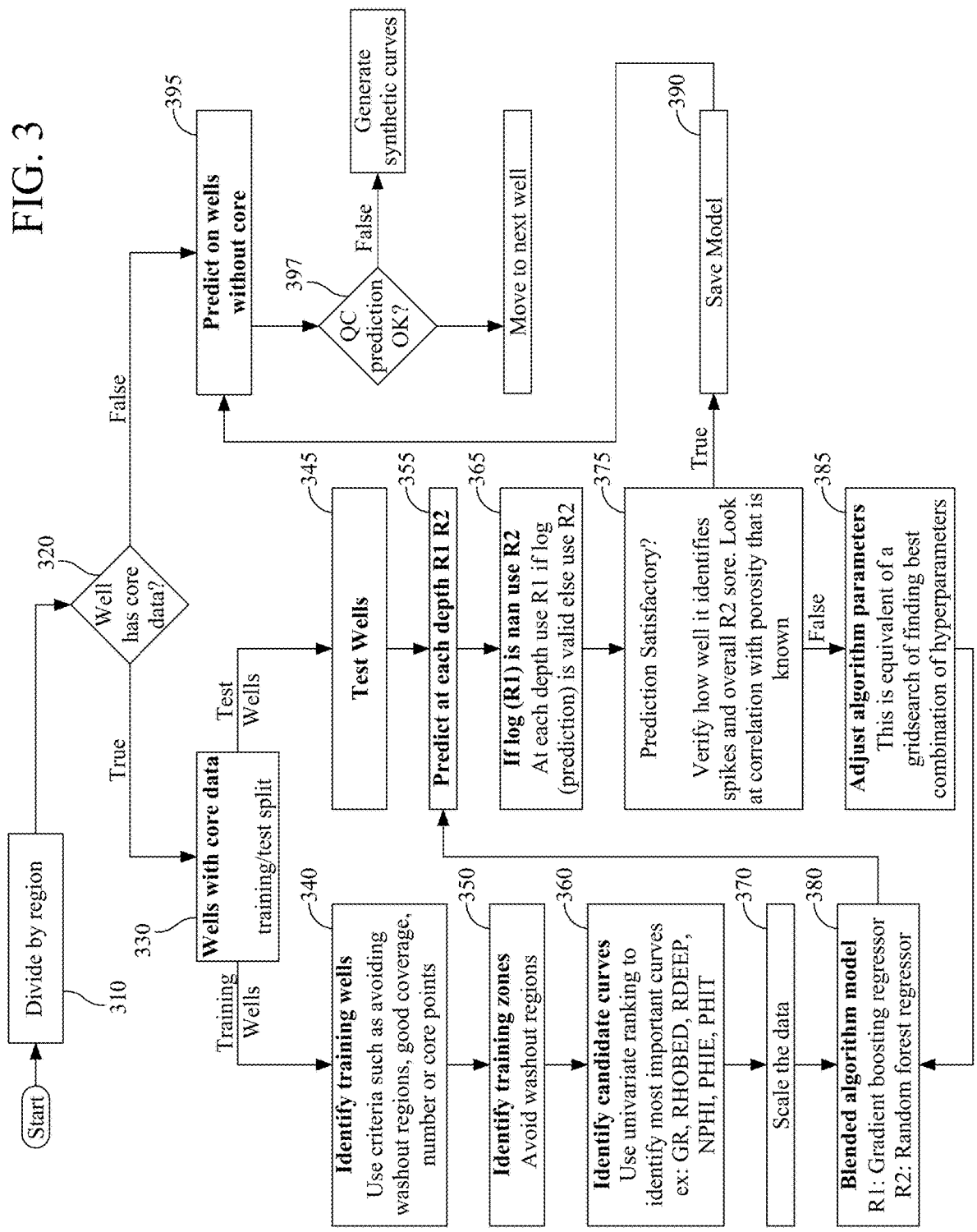
FIG. 3 is a dataflow according to an embodiment.

FIG. 3 is a dataflow according to an embodiment. At 310, the raw well logs are divided per regions (called "fields") with expected similar properties, i.e., formations that have similar lithology, facies and rock properties. For example, in an exploratory mission, about 100 hydrocarbon wells were dug in each of five fields. Besides the well logs acquired for each well, cores were harvested from 10 to 15 of the wells in each field. A separate model may be generated for each field if it is considered necessary.

The well logs are then divided into data corresponding to wells with core data (i.e., core analysis results such as porosity values for a set of depths) and to wells without core data at 320. Further yet, at 330, the data corresponding to wells with core data is divided into data (wells) used for training and data (wells) used for validating (testing) the depth blended models obtained by training.

Data used to generate the depth blended model may further be refined by identifying training wells at 340. In other words, a subset of the well logs corresponding to wells expected to provide stable models according to pre-determined criteria are chosen. The criteria may include avoiding washout regions (where the wells are enlarged while drilled or due to local conditions), the chosen wells have good geographic and depth coverage, and a significant number of cores. A further pruning of the training data may be performed at 360 to identify training zones on the chosen well logs according to one or more rules, such as excluding washout portions.

Further, at 370, the training data may be scaled and/or interpolated to define well log properties values corresponding to the core locations. Sometimes, if there are not enough samples to train a complex model, interpolation is used to increase the number of samples. This technique may yield some accuracy improvement. At 380, regression algorithms are trained to yield a depth blended model. For example, a primary regression algorithm $R_1$ may be gradient boosting, and a secondary regression algorithm $R_2$ is random forest. The depth blended model yields a first permeability value estimated by the primary regression algorithm if the first permeability value meets a predetermined requirement (e.g., to be positive), and yields a second permeability value estimated by a secondary algorithm otherwise.

The depth blended model is then applied at 355 to well logs 345 for which core-analysis-based permeability values are available, other than the training data. At each depth, the depth blended model yields the permeability value output by $R_1$ if this value is positive, and the permeability value output by $R_2$ otherwise at 365. An overall consistency check (e.g., how closely the model matches spikes in well logs, and how close are the permeability values output by $R_1$ and $R_2$) is performed at 375. If these consistency steps yield satisfactory results, then the model is saved at 390. Otherwise the algorithm parameters are adjusted at 385. Steps 355-375 are essentially validating the depth blended model obtained at 380.

Further, the depth blended model is applied to wells for which core-analysis-based permeability values are not available at 395. Other well-by-well quality checks may occur at 397.

Figure 4:
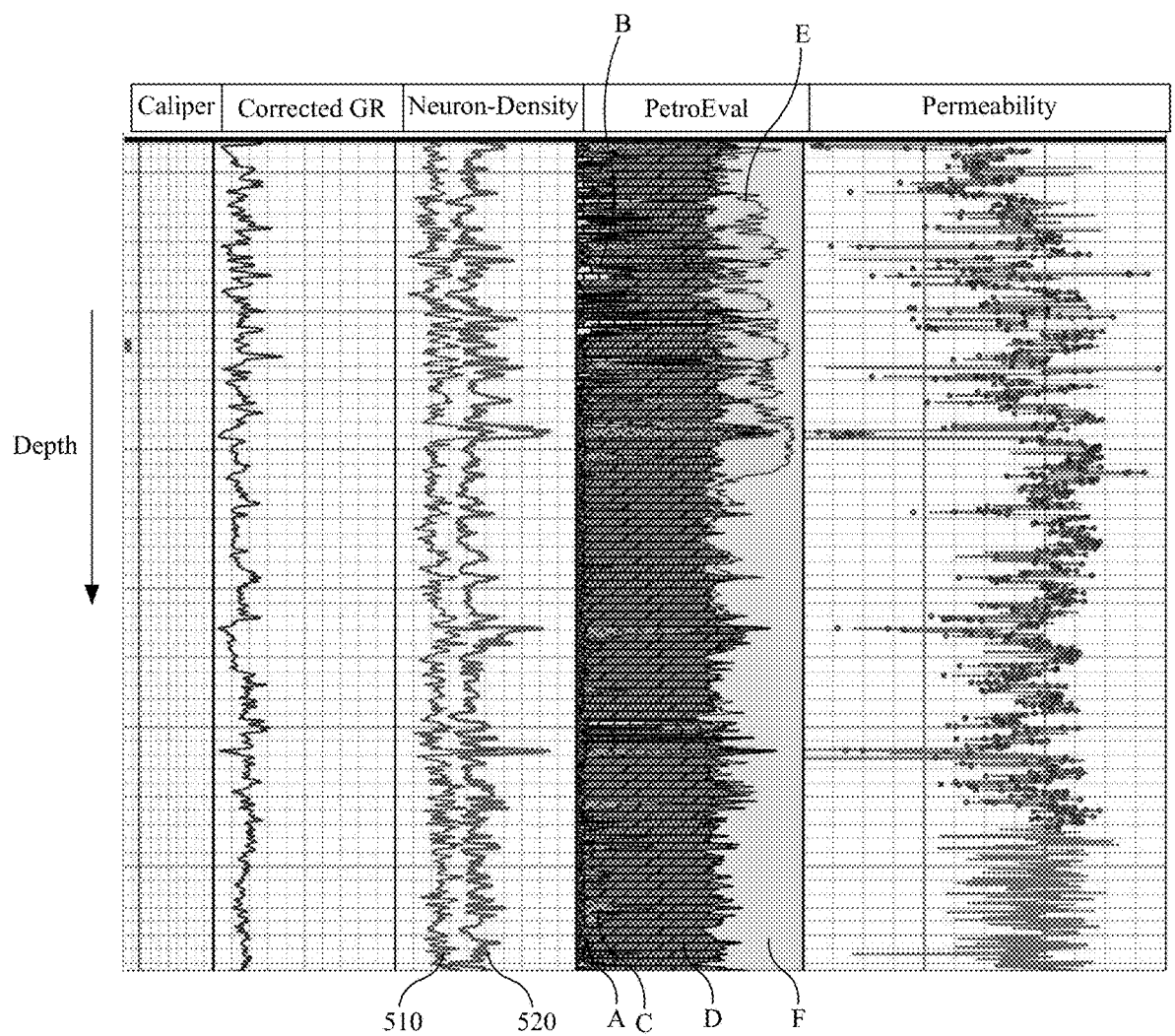
FIGS. 4-7 illustrate depth-dependent well logs and permeability values obtained using an embodiment of the current approach.
Figure 5:
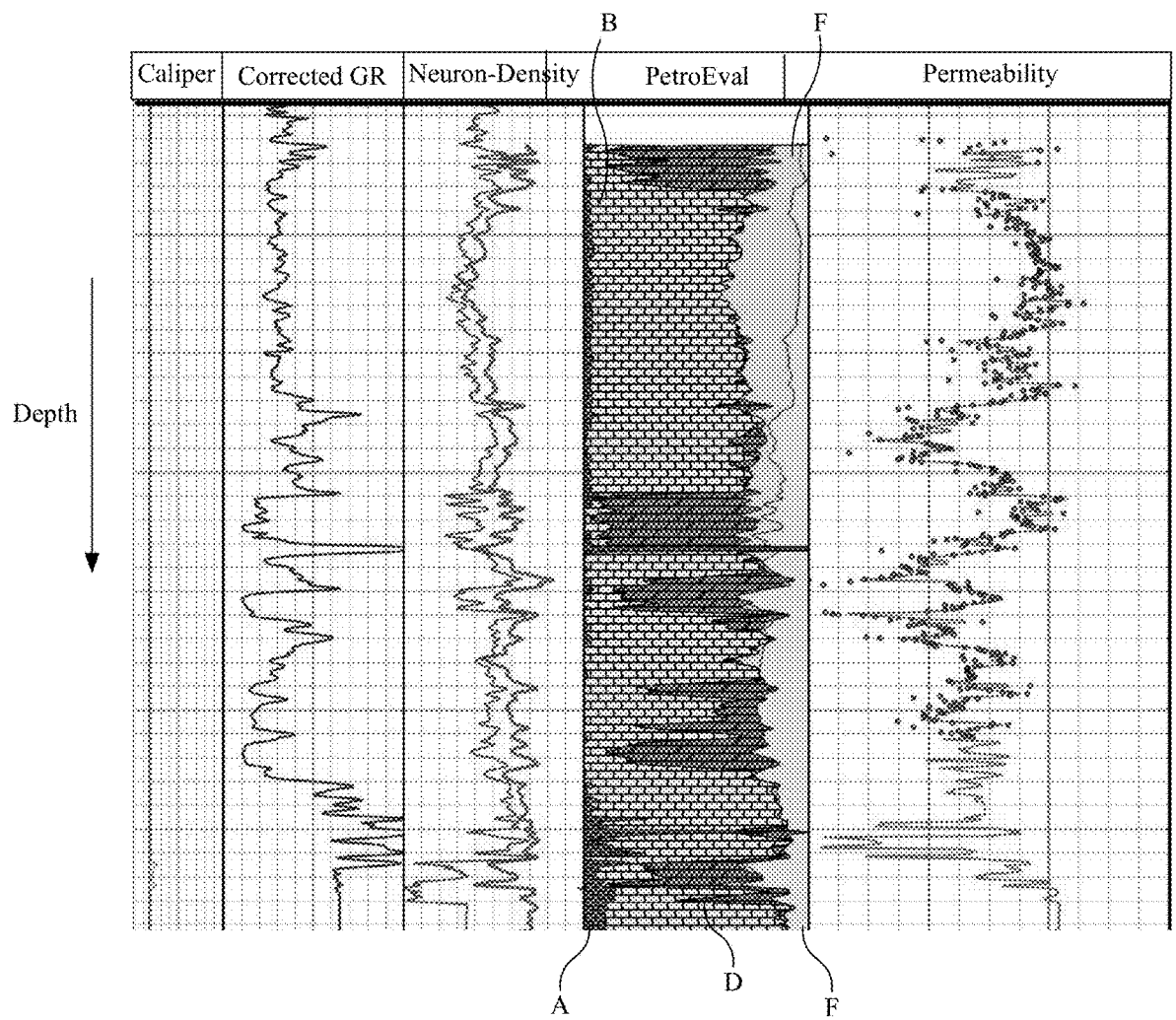
Figure 6:
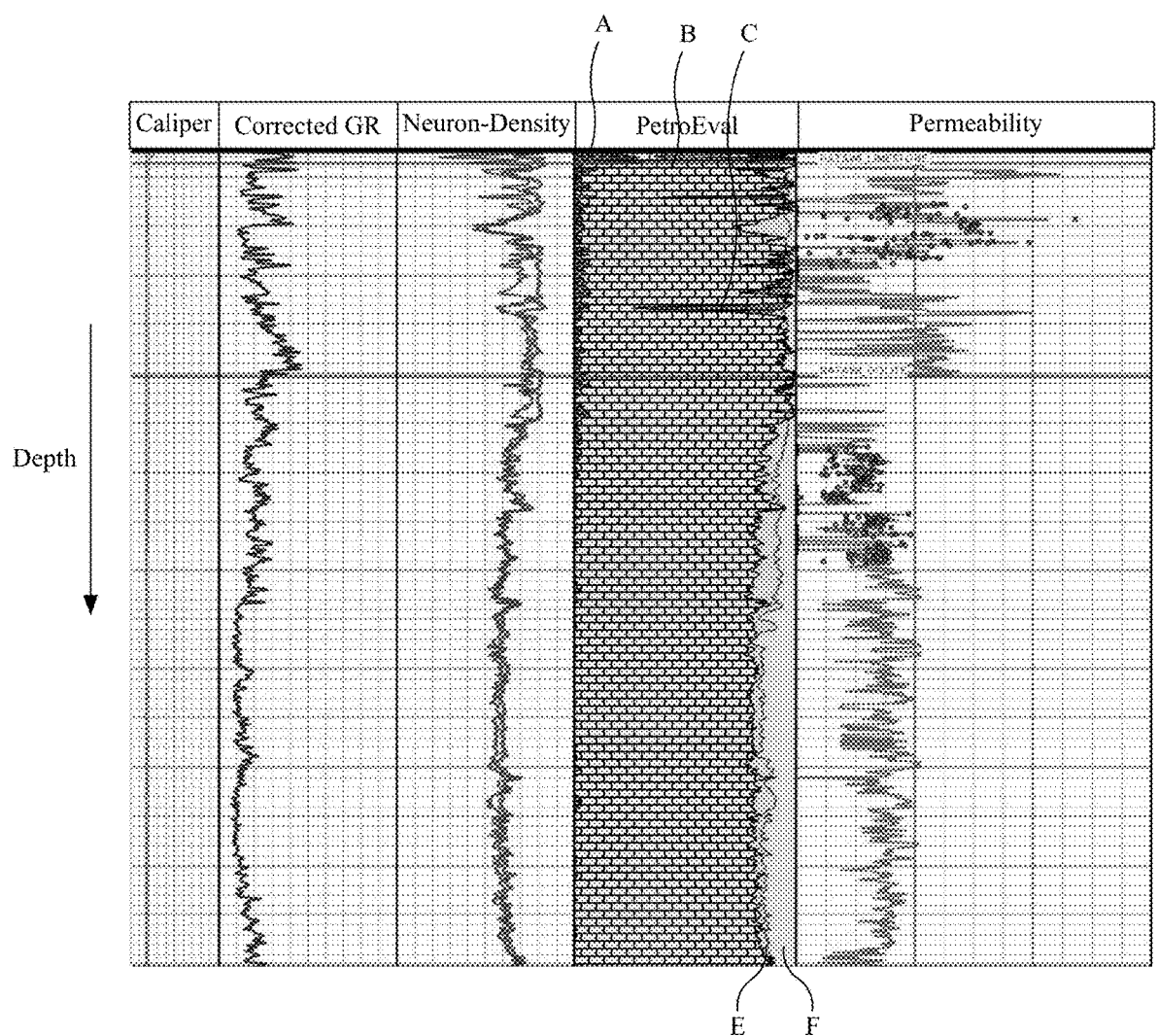
Figure 7:
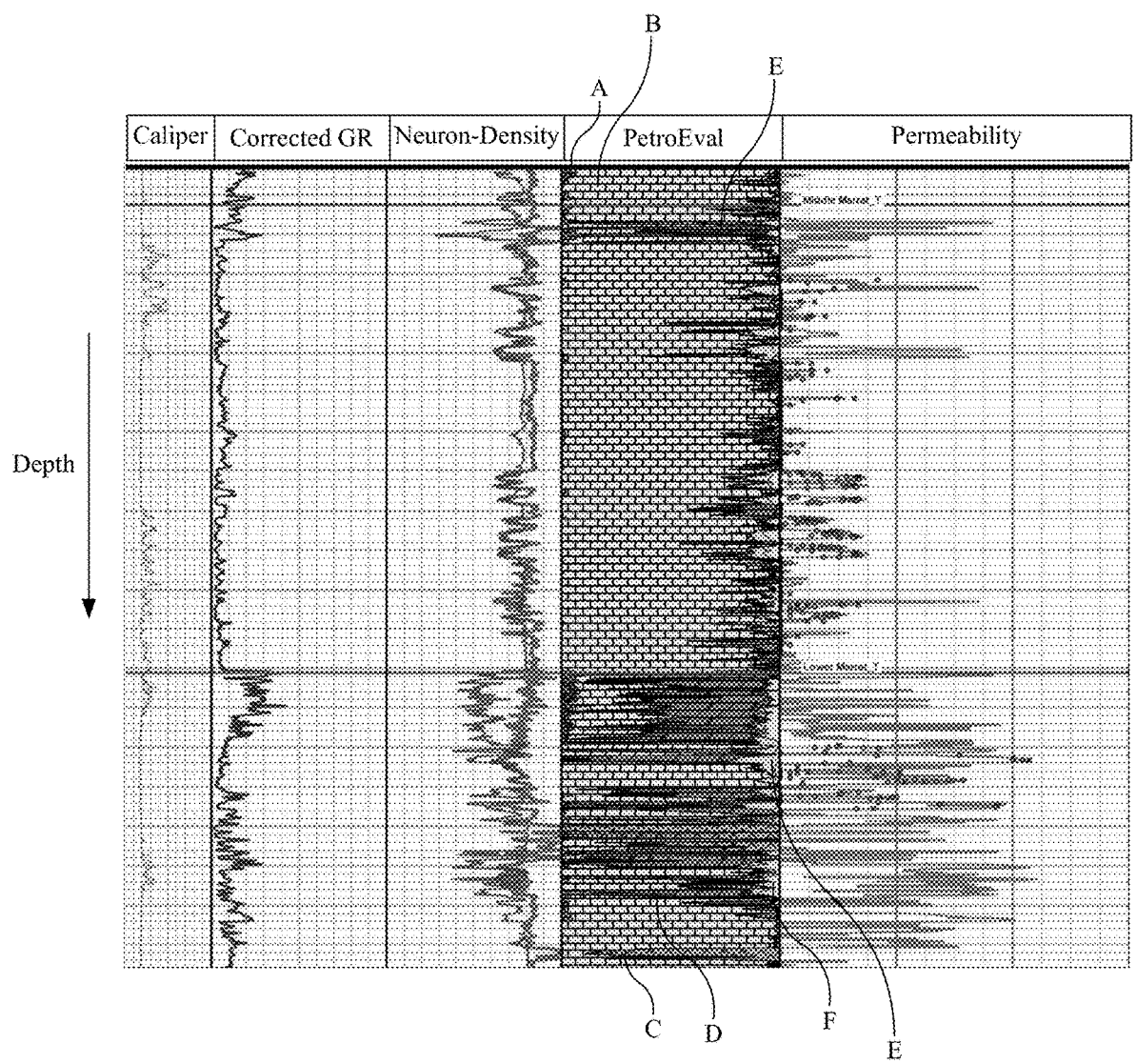
Figure 8:
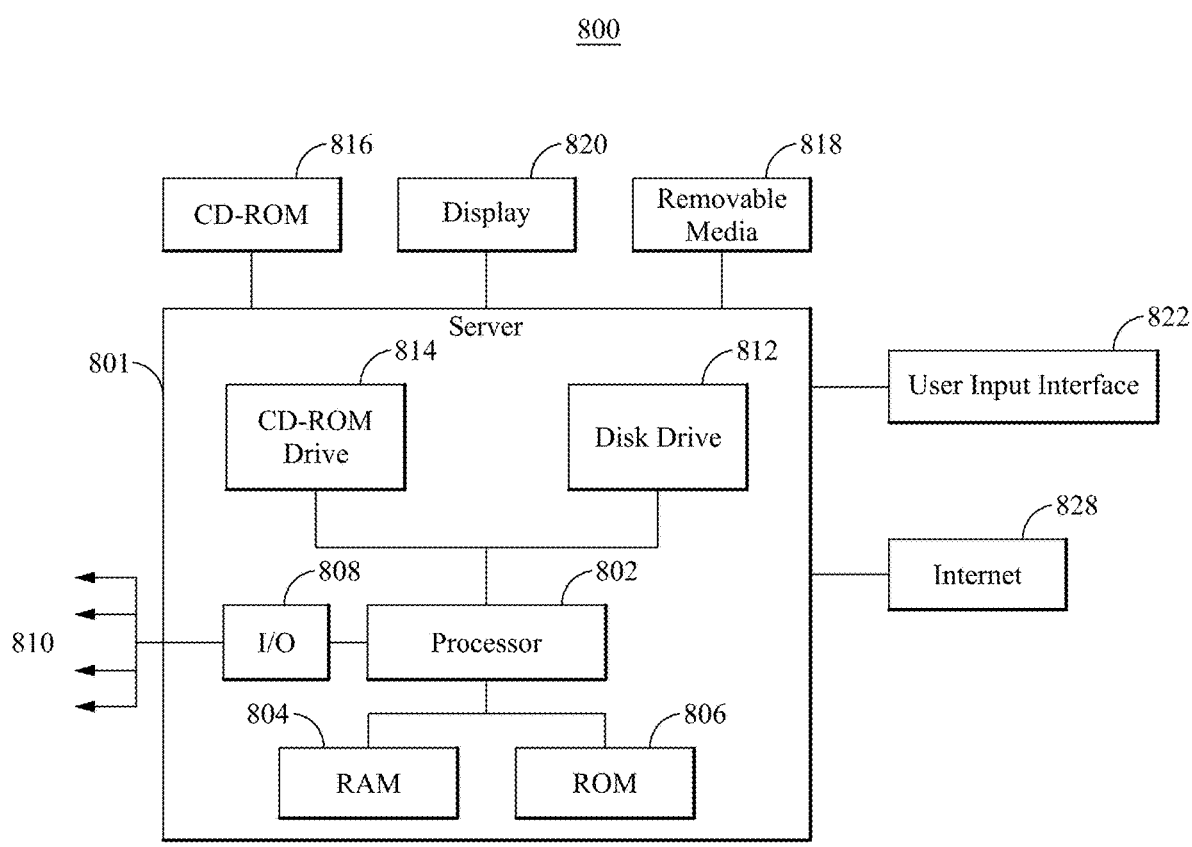
FIG. 8 is a block diagram of a seismic data processing apparatus according to an embodiment.

FIGS. 4-7 illustrate few hundred feet of well logs: gamma ray, neutron density, petrophysical evaluation (the PetroEval track) and permeability (the rightmost graph) at different depths for different formations (Eocene formation in FIG. 4, Masstrichitian formation in FIG. 5, Ratawi formation in FIG. 6, and Marrat formation in FIG. 8). The PetroEval track illustrates the lithology prediction (clay A, calcite B, dolomite C, quartz D and anhydrite E volumes), porosity and fluid that were obtained from the petrophysical analysis. The permeability graph (rightmost in FIGS. 4-7) illustrates the core values as distinct points and the curve obtained using an embodiment of the current approach.

FIG. 8 shows a permeability estimating apparatus 800 according to an embodiment. Apparatus 800 is suitable for performing the activities described in the exemplary embodiments. Server 801 may include a central processor (CPU) 802 coupled to a random-access memory (RAM) 804 and to a read-only memory (ROM) 806. ROM 806 may also be other types of storage media to store programs, such as programmable ROM (PROM), erasable PROM (EPROM), etc. Processor 802 may communicate with other internal and external components through input/output (I/O) circuitry 808 and bussing 810 to provide control signals and the like. Processor 802 carries out a variety of functions as are known in the art, as dictated by software and/or firmware instructions.

Server 801 may also include one or more data storage devices, including hard drives 812, CD-ROM drives 814 and other hardware capable of reading and/or storing information, such as DVD, etc. In one embodiment, software for carrying out the above-discussed steps may be stored and distributed on a CD-ROM or DVD 816, a USB storage device 818 or other form of media capable of portably storing information. These storage media may be inserted into, and read by, devices such as CD-ROM drive 814, disk drive 812, etc. Server 801 may be coupled to a display 820, which may be any type of known display or presentation screen, such as LCD, plasma display, cathode ray tube (CRT), etc. A user input interface 822 is provided, including one or more user interface mechanisms such as a mouse, keyboard, microphone, touchpad, touch screen, voice-recognition system, etc.

Server 801 may be coupled to other devices, such as a logging tool or an electronic microscope, and may be part of a larger network configuration, such as in a global area network (GAN) like the internet 828, which allows ultimate connection to various computing devices.

According to one embodiment, I/O circuitry 808 is configured to well logs and corresponding core-analysis-based permeability values. Processor 802 is configured to select training data from well logs for which core-analysis-based permeability values are available, to train regression algorithms to generate a depth blended model for estimating permeability values based on well logs included the training data with their corresponding core-analysis-based permeability values, and to apply the depth blended model to the well logs other than the training data for obtaining model-estimated permeability values.

In yet another embodiment, RAM 804 stores executable codes that, when executed, make processor 802 select training data from well logs for which core-analysis-based permeability values are available, train regression algorithms to generate a depth blended model for estimating permeability values based on well logs included in the training data with their corresponding core-analysis-based permeability values, and apply the depth blended model to the well logs other than the training data for obtaining model-estimated permeability values.

The disclosed embodiments provide methods and apparatuses for estimating permeability values based on well logs using a depth blended model generated by trained regression algorithms (the training using core-analysis-based permeability values). It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for estimating permeability values based on well logs, the method comprising:
   selecting training data and test data from well logs for which core-analysis-based permeability values are available;
   training two regression algorithms using the training data to generate a depth blended model for estimating permeability values, the core-analysis-based permeability values being used for calibrating the depth blended model which outputs first values obtained via a first regression algorithm among the two regression algorithms when the first values are positive, and outputs second permeability values obtained via a second regression algorithm among the two regression algorithms otherwise;
   selectively adjusting algorithm parameters of the two regression algorithms depending on an overall consistency check of the first values and the second values obtained for the test data; and
   applying the depth blended model to the well logs for which respective core-analysis-based permeability values are not available to estimate model-based permeability values,
   wherein the model-based permeability values are used to plan hydrocarbon production.

2. The method of claim 1, wherein the well logs used to build the depth blended model include total porosity, gamma ray, resistivity, volume of calcite, density, and neutron logs.

3. The method of claim 1, wherein the selecting includes grouping the well logs according to regions expected to have similar characteristics.

4. The method of claim 1, wherein the selecting includes choosing a subset of the well logs corresponding to wells expected to provide stable models according to pre-determined criteria.

5. The method of claim 4, wherein the selecting further includes identifying training zones on the chosen well logs according to one or more rules.

6. The method of claim 1, wherein the selecting includes pre-processing the training data by scaling and/or interpolating.

7. The method of claim 1, wherein the primary regression algorithm is a gradient boosting, and the secondary regression algorithm is a random forest algorithm.

8. The method of claim 1, wherein the overall consistency check includes at least one of:
   comparing permeability values obtained using the depth blended model with the core-analysis-based permeability values, or
   comparing the first values with the second values.

9. The method of claim 1, further comprising:
   performing well-by-well quality checks for the model-estimated permeability values.

10. A permeability estimating apparatus, comprising:
    a processor configured
       to select training data and test data from well logs for which core-analysis-based permeability values are available,
       to train two regression algorithms to generate a depth blended model for estimating permeability values, based on well logs included the training data with their corresponding core-analysis-based permeability values being used for calibrating the depth blended model, the depth blended model outputting first values obtained by applying a first regression algorithm among the two regression algorithms when the first values are positive, and outputting second permeability values obtained by applying a second regression algorithm among the two regression algorithms otherwise,
       selectively adjusting algorithm parameters of the two regression algorithms depending on an overall consistency check of the first values and the second values obtained for the test data; and
       to apply the depth blended model to the well logs for which respective core-analysis-based permeability values are not available for obtaining model-estimated permeability values; and
    a communication interface connected to the processor and configured to exchange data with other devices and/or enable interaction with a user,
    wherein the model-estimated permeability values are used to plan hydrocarbon production, and the depth blended model selectively outputs values obtained via at least two of the regression algorithms.

11. The permeability estimating apparatus of claim 10, wherein the well logs used to build the depth blended model include total porosity, gamma ray, volume of calcite, density, and neutron logs.

12. The permeability estimating apparatus of claim 10, wherein when selecting the training data, the processor groups the well logs according to regions expected to have similar characteristics.

13. The permeability estimating apparatus of claim 10, wherein, when selecting the training data, the processor chooses a subset of the well logs corresponding to wells expected to provide stable models according to pre-determined criteria.

14. The permeability estimating apparatus of claim 13, wherein, when selecting the training data, the processor identifies training zones on the chosen well logs according to one or more rules.

15. The permeability estimating apparatus of claim 10, wherein the processor is further configured to perform pre-processing of the training data by scaling and/or interpolating.

16. The permeability estimating apparatus of claim 10, wherein the primary regression algorithm is a gradient boosting, and the second regression algorithm is a random forest algorithm.

17. The permeability estimating apparatus of claim 10, wherein the processor is further configured to perform the overall consistency check including at least one comparing permeability values obtained using the depth blended model with the core-analysis-based permeability values, or comparing first values with second values.

18. The permeability estimating apparatus of claim 10, wherein the processor is further configured to perform well-by-well consistency checks for the model-estimated permeability values.

19. The method of claim 1, wherein the core-analysis-based permeability values are obtained by analyzing well rock samples outside the well, the well rock samples being sampled at substantially larger intervals than intervals between measurements of the well logs.

20. The permeability estimating apparatus of claim 10, wherein the core-analysis-based permeability values are obtained by analyzing well rock samples outside the well, the well rock samples being sampled at substantially larger intervals than intervals between measurements of the well logs.

* * * * *